United States Patent
Taniguchi et al.

(10) Patent No.: US 8,906,547 B2
(45) Date of Patent: Dec. 9, 2014

(54) NEGATIVE ELECTRODE MATERIAL FOR NON-AQUEOUS ELECTROLYTE SECONDARY BATTERY AND NON-AQUEOUS ELECTROLYTE SECONDARY BATTERY

(75) Inventors: Kazuyuki Taniguchi, Annaka (JP); Tetsuo Nakanishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 68 days.

(21) Appl. No.: 13/618,511

(22) Filed: Sep. 14, 2012

(65) Prior Publication Data

US 2013/0078516 A1 Mar. 28, 2013

(30) Foreign Application Priority Data

Sep. 22, 2011 (JP) ................................. 2011-207085

(51) Int. Cl.
| | | |
|---|---|---|
| *H01M 4/60* | (2006.01) | |
| *H01M 4/36* | (2006.01) | |
| *H01M 4/62* | (2006.01) | |
| *H01M 4/38* | (2006.01) | |
| *H01M 4/02* | (2006.01) | |

(52) U.S. Cl.
CPC .............. *H01M 4/366* (2013.01); *Y02E 60/122* (2013.01); *H01M 2004/027* (2013.01); *H01M 4/625* (2013.01); *H01M 4/623* (2013.01); *H01M 4/386* (2013.01)
USPC ....................................................... 429/213

(58) Field of Classification Search
CPC ..... H01M 4/366; H01M 4/386; H01M 4/623; H01M 4/625
USPC ....................................................... 429/213
See application file for complete search history.

(56) References Cited

U.S. PATENT DOCUMENTS

| | | |
|---|---|---|
| 5,395,711 A | 3/1995 | Tahara et al. |
| 2006/0063073 A1* | 3/2006 | Kawashima et al. ......... 429/246 |
| 2006/0188778 A1 | 8/2006 | Nanno et al. |
| 2009/0004568 A1 | 1/2009 | Hirose et al. |
| 2009/0111019 A1 | 4/2009 | Hirose et al. |
| 2010/0015453 A1 | 1/2010 | Yamaguchi et al. |

FOREIGN PATENT DOCUMENTS

| | | |
|---|---|---|
| EP | 2 145 911 A1 | 1/2010 |
| JP | B2-2997741 | 1/2000 |
| JP | A-2006-269417 | 10/2006 |
| JP | A-2008-293872 | 12/2008 |
| JP | A-2009-110845 | 5/2009 |
| JP | A-2010-043251 | 2/2010 |
| JP | A-2010-044958 | 2/2010 |
| JP | A-2010-146740 | 7/2010 |
| JP | A-2011-011928 | 1/2011 |
| JP | A-2011-014298 | 1/2011 |

OTHER PUBLICATIONS

European Search Report issued in Application No. 12006540.4; Dated Jan. 4, 2013.
Mar. 25, 2014 Office Action issued in Japanese Patent Application No. 2011-207085 (with partial translation).

* cited by examiner

*Primary Examiner* — Nicholas P D'Aniello
(74) *Attorney, Agent, or Firm* — Oliff PLC

(57) ABSTRACT

The present invention provides a negative electrode material for a non-aqueous electrolyte secondary battery that includes particles of a silicon-based active material, the particles of a silicon-based active material being coated with a film of an organosilicon compound that contains a perfluoropolyether group, and a non-aqueous electrolyte secondary battery therewith. As a result, there is provided a negative electrode material for a non-aqueous electrolyte secondary battery that is high in capacity, excellent in initial charge/discharge efficiency and cycle characteristics and high in safety and reliability, and a non-aqueous electrolyte secondary battery that uses the negative electrode material.

15 Claims, No Drawings

NEGATIVE ELECTRODE MATERIAL FOR NON-AQUEOUS ELECTROLYTE SECONDARY BATTERY AND NON-AQUEOUS ELECTROLYTE SECONDARY BATTERY

BACKGROUND OF THE INVENTION

1. Field of the Invention

The present invention relates to a negative electrode material for a non-aqueous electrolyte secondary battery and a non-aqueous electrolyte secondary battery that uses a negative electrode material for a non-aqueous electrolyte secondary battery.

2. Description of the Related Art

In recent years, with a remarkable development of portable electronic devices, communication devices and electric cars, from the viewpoint of economic efficiency, long life of devices and small size and light weight, a non-aqueous electrolyte secondary battery having high capacity and high energy density is in strong demand.

Accordingly, a silicon-based active material that is high in theoretical capacity as a negative electrode material is gathering attention. For example, in patent document 1, by using silicon oxide in a non-aqueous electrolyte secondary battery, for example, as a negative electrode material for a lithium ion secondary battery, an electrode having high capacity is obtained. However, there are problems such that irreversible capacity at the initial charge/discharge is large, and the cycle property does not reach a practically-usable level, that is, there is a room for improvement.

Further, in a non-aqueous electrolyte secondary battery that uses a silicon-based active material in a negative electrode material, gas is observed to evolve in a cell. Since this is an issue largely related to safety and reliability of a battery, a countermeasure is in demand.

Regarding the reason why the gas is generated within a battery, the following mechanism is assumed.

It is known that $LiPF_6$, which is used as an electrolyte in a general lithium ion secondary battery, reacts with water according to a reaction shown in the following chemical reaction formula (a).

$$LiPF_6 + H_2O \rightarrow LiF + 2HF + POF_3 \qquad (a)$$

In addition, it is known that $SiO_2$ reacts with HF according to the following chemical reaction formula (b).

$$SiO_2 + 4HF \rightarrow SiF_4 + 2H_2O \qquad (b)$$

That is, it is considered that in a battery that uses a silicon-based active material in a negative electrode, according to a reaction shown by the chemical reaction formula (a) between water that is slightly present within a battery and $LiPF_6$ that is an electrolyte, HF gas is generated, and the HF gas reacts with $SiO_2$ that is contained in the silicon-based active material according to the chemical reaction formula (b) to generate a gas. It is further considered that, since water is generated according to a reaction shown by the chemical reaction formula (b), the two reactions are repeated inside a battery, a large amount of gas is generated. Accordingly, it is considered effective to modify a surface of particles to suppress the reaction according to the chemical reaction formula (b) to suppress gas generation inside a cell.

Regarding a silicon-based active material in which a surface of particles is modified, Patent Documents 2, 3, 4 etc. have been reported, and regarding a negative electrode that is obtained by forming a fluororesin film on a negative electrode active material layer, Patent Documents 5, 6, 7 etc. have been reported. However, according to the study by the present inventors, when a negative electrode material and a negative electrode prepared according to the similar method were subjected to a gas generation test, gas generation was found. That is, from the viewpoint of safety and reliability of a battery, a further improvement is necessary.

CITATION LIST

Patent Documents

Patent Document 1: Japanese Patent No. 2997741
Patent Document 2: Japanese Unexamined Patent Publication (Kokai) No. 2006-269417
Patent Document 3: Japanese Unexamined Patent Publication (Kokai) No. 2011-11928
Patent Document 4: Japanese Unexamined Patent Publication (Kokai) No. 2011-14298
Patent Document 5: Japanese Unexamined Patent Publication (Kokai) No. 2008-293872
Patent Document 6: Japanese Unexamined Patent Publication (Kokai) No. 2009-110845
Patent Document 7: Japanese Unexamined Patent Publication (Kokai) No. 2010-44958

SUMMARY OF THE INVENTION

The present invention was made in view of the above situation, and has an object to provide a negative electrode material for a non-aqueous electrolyte secondary battery that is high in capacity, excellent in initial charge/discharge efficiency and cycle characteristics, and high in safety and reliability, and a non-aqueous electrolyte secondary battery that uses the negative electrode material.

In order to solve the above problem, the present invention provides a negative electrode material for a non-aqueous electrolyte secondary battery that contains particles of a silicon-based active material, wherein the particles of a silicon-based active material are coated with a film of an organosilicon compound that contains a perfluoropolyether group.

When a negative electrode material for a non-aqueous electrolyte secondary battery like this is used, a negative electrode material for a non-aqueous electrolyte secondary battery, which is high in capacity, high in initial charge/discharge efficiency and, because gas generation inside a battery is suppressed compared with a conventional non-aqueous electrolyte secondary battery, high in safety and reliability can be obtained.

In this case, it is preferable that the film of an organosilicon compound that contains the perfluoropolyether group is 0.1% by mass or more and 5% by mass or less of particles of the silicon-based active material.

When a mass ratio of the film of an organosilicon compound that contains a perfluoropolyether group is set like this, more efficiently, a negative electrode material for a non-aqueous electrolyte secondary battery which is high in capacity and initial charge/discharge efficiency and can suppress gas generation inside a battery can be obtained.

Further, the organosilicon compound having a perfluoropolyether group is preferred to be a compound having a structure represented by the following formula (1),

$$F-(C_xF_{2x}O)_{\overline{m}}C_yF_{2y}-R-Si \qquad (1)$$

wherein R represents an organic group, m represents an integer of 1 or more, and x and y each represent an integer of 1 to 4.

Further, in this case, it is preferable that a perfluoropolyether part represented by the following formula (2) in the formula (1),

(2)

has a structure represented by the following formula (3),

(3)

wherein m represents the same as that described above.

When an organosilicon compound having a structure like this is used, more efficiently, the gas generation inside a battery can be suppressed.

In the present invention, the particles of a silicon-based active material can be made of any of silicon simple substance, silicon oxide, silicon oxide coated with a carbon film, and a silicon alloy.

When particles of a silicon-based active material formed of a material like this are used, while making use of advantages of the respective materials, an advantage of the present invention can be more effectively imparted.

Further, the present invention provides a non-aqueous electrolyte secondary battery that uses any one of the negative electrode materials for a non-aqueous electrolyte secondary battery.

Like this, when a non-aqueous electrolyte secondary battery uses any one of the negative electrode materials for a non-aqueous electrolyte secondary battery, a non-aqueous electrolyte secondary battery that is high in capacity, excellent in initial charge/discharge efficiency and cycle characteristics, can reduce gas generation inside a battery, and is high in safety and reliability can be obtained.

According to the present invention, a negative electrode material for a non-aqueous electrolyte secondary battery, which is high in capacity, excellent in initial charge/discharge efficiency and cycle characteristics, can reduce gas generation inside a battery, is high in safety and reliability, is convenient in manufacturing method, and can sufficiently endure industrial-scale production, and a non-aqueous electrolyte secondary battery that uses the negative electrode material can be provided.

DETAILED DESCRIPTION OF THE PREFERRED EMBODIMENTS

In what follows, the present invention will be detailed. However, the present invention is not restricted thereto.

A negative electrode material for a non-aqueous electrolyte secondary battery of the present invention includes particles of a silicon-based active material, the particles of a silicon-based active material being covered with a film of an organosilicon compound that contains a perfluoropolyether group.

When a non-aqueous electrolyte secondary battery uses a negative electrode material for a non-aqueous electrolyte secondary battery having a structure like this, a non-aqueous electrolyte secondary battery, which is higher in capacity, less in gas generation inside a battery, and high in safety and reliability than ever can be obtained. In addition, a structure itself of a battery is substantially the same as that of a general non-aqueous electrolyte secondary battery; accordingly, the production thereof is easy and there is no problem upon mass-producing.

In a negative electrode material for a non-aqueous electrolyte secondary battery of the present invention, a film of an organosilicon compound that contains a perfluoropolyether group is preferably 0.1% by mass or more and 5% by mass or less of particles of a silicon-based active material. When the mass ratio is 0.1% by mass or more, an advantage of suppression of gas generation can be sufficiently obtained. On the other hand, when the mass ratio is 5% by mass or less, it is difficult to form aggregates of particles and a ratio of inactive materials is not so much as to deteriorate the charge/discharge capacity. That is, when the mass ratio is within the range, a negative electrode material for a non-aqueous electrolyte secondary battery, which is high in capacity, high in the initial charge/discharge efficiency, can suppress gas generation inside a battery can be more effectively obtained.

In what follows, a negative electrode material for a non-aqueous electrolyte secondary battery of the present invention and a non-aqueous electrolyte secondary battery therewith will be specifically described.

Firstly, a negative electrode material for a non-aqueous electrolyte secondary battery will be described.

A silicon-based active material in the present invention can be made of any one of silicon (silicon simple substance), silicon oxide, silicon oxide coated with a carbon film, and a silicon alloy. When particles of these silicon-based active materials are used, while making use of the respective advantages thereof, an effect of the present invention can be imparted.

Unless clearly stated otherwise, the silicon oxide in the present invention is a generic name of silicon oxides represented by a formula SiOx (0<x<2) and can be obtained by heating a mixture of silicon dioxide and metallic silicon, followed by cooling and precipitating a generated silicon oxide gas. Further, what is obtained by etching the resulted silicon oxide particles with hydrogen fluoride, what is obtained by reducing silicon dioxide or silicon oxide, what has a structure in which silicon nano particles are dispersed in silicon oxide, and what is obtained by coating these with a conductive film as well are called as silicon oxide in the present invention.

A silicon alloy indicates an alloy between silicon and one or more kinds of metals, and a composition thereof is not particularly restricted.

The physical properties of particles of silicon-based active material are appropriately selected depending on targeted composite particles. An average particle size thereof is desirable to be 0.1 to 50 μm. The lower limit thereof is more desirable to be 0.2 μm or more, and still more desirable to be 0.5 μm or more. The upper limit thereof is desirable to be 30 μm or less and more desirable to be 20 μm or less. An average particle size in the present invention is a volume average particle size in a particle size distribution measurement by laser diffraction method.

A BET specific surface of particles having a structure where silicon nano particles are dispersed in silicon oxide is desirable to be 0.5 to 100 m²/g and more desirable to be 1 to 20 m²/g.

An organosilicon compound that has a perfluoropolyether group, which is used in the present invention, is preferable to be a compound having a structure represented by a formula (1),

(1)

wherein R represents an organic group, m represents an integer of 1 or more, and x and y each represent an integer of 1 to 4.

In the formula (1), R represents an organic group as shown above. Examples of the organic groups include alkylene groups and oxyalkylene groups having 2 to 10 carbon atoms, preferably 2 to 4 carbon atoms, and amide groups having 1 to 5 carbon atoms, preferably 1 to 3 carbon atoms.

Further, m represents an integer of 1 or more as described above, preferably 2 to 50, more preferably 2 to 30, and particularly preferably 2 to 10.

In the organosilicon compound that contains a perfluoropolyether group, a perfluoropolyether part represented by the following formula (2) in the formula (1),

(1)

is preferable to have a structure represented by the following formula (3),

(3)

wherein m represents the same as that described above.

Specific examples of structures represented by the formula (1) include what is represented by the following formulae,

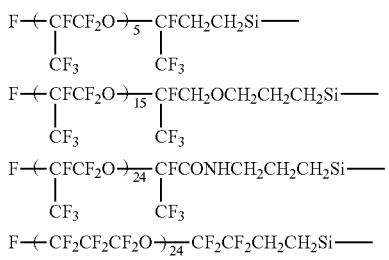

A molecular structure of an organosilicon compound that has a perfluoropolyether group is not restricted to what were illustrated above.

The organosilicon compound that contains a perfluoropolyether group can be produced according to a well-known technology. As a producing method thereof, a method described in Japanese Unexamined Patent Publication (Kokai) No. 2010-043251 has been reported.

A film of an organosilicon compound that contains a perfluoropolyether group that has a structure represented by the formula (1) can be readily formed according to a wet method where a silane coupling agent having a structure represented by the formula (1) is added to a slurry of a silicon-based active material to hydrolyze, followed by drying, or a dry method where the silane coupling agent is sprayed to the particles.

A ratio of a film of an organosilicon compound that contains a perfluoropolyether group on a surface of particles of silicon-based active material relative to particles of the silicon-based active material is preferably 0.1% by mass or more and 5% by mass or less, more preferably 0.5% by mass or more and 3% by mass or less. When the mass ratio is 0.1% by mass or more, the gas generation can be sufficiently suppressed. On the other hand, when the mass ratio is 5% by mass or less, aggregates of particles are difficult to generate, and a ratio of inactive materials is not so much as to deteriorate the charge/discharge capacity. As the result, when the mass ratio is in the range, a negative electrode material for a non-aqueous electrolyte secondary battery, by which high capacity and high initial charge/discharge efficiency can be obtained, and gas generation inside a battery is suppressed can be obtained.

To a negative electrode material and a negative electrode in the present invention, a lithium pre-doping treatment can be applied to improve the initial charge/discharge efficiency. When applying the pre-doping treatment, a known technology such as a method where after a silicon-based active material and lithium or a lithium compound are mixed and heated, a film of an organosilicon compound that contains a perfluoropolyether group is formed, or a method where after an electrode is prepared by the use of a silicon-based active material from which the film of organosilicon compound was formed, a lithium foil is attached to an electrode can be used without particular restriction.

A negative electrode material for a non-aqueous electrolyte secondary battery in the present invention is preferably imparted with the conductivity. The conductivity can be obtained according to a method where particles of silicon-based active material, which are coated with a film of an organosilicon compound that contains a perfluoropolyether group, and conductive particles such as carbon are mixed, a method where after particles of silicon-based active material are coated with a carbon film, a film of an organosilicon compound that contains a perfluoropolyether group is formed, or a method where both of the methods described above are combined. As a method for coating with a carbon film, a method where chemical vapor deposition (CVD) is performed in an organic gas is preferred. This method can be efficiently performed by introducing an organic gas into a reaction vessel during heat treatment.

Specifically, by treating particles of silicon-based active material, in an organic gas, under normal pressure or reduced pressure of 50 to 30000 Pa, at a temperature of 700 to 1200° C., on a surface of particles of silicon-based active material, a carbon film can be chemical vapor deposited. The pressure is desirably 50 to 10000 Pa, and more desirably 50 to 2000 Pa. When a decompression degree is set to 30000 Pa or less, a fear that a ratio of graphite material having a graphite structure becomes much to deteriorate a battery capacity and the cycle characteristics when used as a negative electrode material for a non-aqueous electrolyte secondary battery can be assuredly avoided.

The temperature of chemical vapor deposition is desirably 800 to 1200° C., and more desirably 900 to 1100° C. By setting a treatment temperature at 800° C. or more, a longer heat treatment time is not necessitated. Further, by setting a heat treatment temperature at 1200° C. or less, particles are not likely to fuse or flocculate with each other by the chemical vapor deposition. Accordingly, a fear that owing to a flocculated surface, a conductive film is not formed, and, when used as a negative electrode material for a non-aqueous electrolyte secondary battery, the cycle characteristics are deteriorated can be eliminated.

A treatment time is appropriately selected depending on an amount of targeted coated carbon, a treatment temperature, a concentration (flow rate) and an introduced amount of an organic gas. Usually, 1 to 10 hours, in particular, about 2 to 7 hours is economically efficient.

As an organic substance used as a raw material for generating an organic gas in the above, in particular under a non-oxidative atmosphere, what can generate carbon (graphite) by pyrolysis at the heat treatment temperature is selected.

Examples of the organic substances include: chain hydrocarbons such as methane, ethane, ethylene, acetylene, propane, butane, butene, pentane, isobutane, and hexane; cyclic hydrocarbons such as cyclohexane; or mixtures thereof; monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene; and mixtures thereof. Further, gas light oil, creosote oil, anthracene oil, and tar oil by naphtha pyrolysis, which are obtained in the course of a tar distillation step, may be used singularly or in a mixture thereof.

An amount of coated carbon is not particularly restricted. It is desirable to be 0.3 to 40% by mass and more desirable to be 0.5 to 20% by mass with respect to an entirety of carbon coated particles.

When an amount of coated carbon is set at 0.3% by mass or more, sufficient conductivity can be maintained. As a result, the cycle characteristics when used as a negative electrode material for a non-aqueous electrolyte secondary battery can be assuredly improved. Further, by setting an amount of coated carbon at 40% by mass or less, an effect of coating can be improved, and deterioration of the charge/discharge capacity when a ratio of graphite increased in the negative electrode material can be assuredly avoided.

The physical properties of composite particles after carbon coating are not particularly restricted. However, an average particle size thereof is desirably 0.1 to 50 μm, and the lower limit thereof is desirably 0.2 μm or more and more desirably 0.5 μm or more. On the other hand, the upper limit thereof is desirably 30 μm or less and more desirably 20 μm or less. The average particle size here is a volume average particle size in a particle size distribution measurement by laser diffraction.

By setting an average particle size to 0.1 μm or more, there is no fear that a specific surface area becomes large, a ratio of silicon oxide on a particle surface becomes large, and when used as a negative electrode material for a non-aqueous electrolyte secondary battery, a battery capacity is deteriorated. When an average particle size is set to 50 μm or less, the battery characteristics can be inhibited from deteriorating by becoming a foreign matter upon coating on an electrode.

A BET specific surface area after carbon coating is desirably 0.5 to 100 $m^2/g$ and more desirably 1 to 20 $m^2/g$.

When a BET specific surface area is set to 0.5 $m^2/g$ or more, there is no fear that the adhesiveness when coated on an electrode deteriorates to deteriorate the battery characteristics. When a BET specific surface area is set to 100 $m^2/g$ or less, there is no fear that a ratio of silicon oxide on a particle surface becomes large to deteriorate the battery capacity when used as a negative electrode material for a lithium ion secondary battery.

In a non-aqueous electrolyte secondary battery such as described above, a conductive agent such as carbon or graphite can be added to a negative electrode. Also in this case, the kind of the conductive agent is not particularly restricted as long as it is an electroconductive material that does not cause decomposition or modification in a configured battery.

Specific examples of conductive agents include particles or fibers of metals such as Al, Ti, Fe, Ni, Cu, Zn, Ag, Sn, and Si, or graphites such as natural graphite, artificial graphite, particles of various kinds of cokes, mesophase carbon, vapor deposited carbon fibers, pitch base carbon fibers, PAN base carbon fibers, and various kinds of resin sintered bodies.

A non-aqueous electrolyte solution contains a non-aqueous organic solvent and an electrolyte dissolved therein.

As an electrolyte, what is generally used as an electrolyte of a non-aqueous electrolyte secondary battery can be selected without particularly restricting. Examples thereof include $LiPF_6$, $LiN(CF_3SO_2)_2$, $LiN(C_2F_5SO_2)_2$, $LiClO_4$, $LiBF_4$, $LiSO_3CF_3$, LiBOB, LiFOB, LiDFOB or mixtures thereof.

As a non-aqueous organic solvent, what is known as used in an electrolyte solution of a non-aqueous electrolyte secondary battery can be appropriately selected and used without particular restriction.

Examples thereof include: cyclic carbonates such as ethylene carbonate, propylene carbonate, fluoroethylene carbonate, and difluoroethylene carbonate; chain carbonates such as dimethyl carbonate, diethyl carbonate, and ethyl methyl carbonate; organic solvents such as γ-butyrolactone, dimethoxyethane, tetrahydropyran, N,N-dimethyl formamide, and ethers containing a perfluoropolyether group (Japanese Unexamined Patent Publication (Kokai) No. 2010-146740); or mixtures thereof.

In these non-aqueous organic solvents, any additive can be used at any appropriate amount. Examples of the additives include cyclohexylbenzene, biphenyl, vinylene carbonate, succinic anhydride, ethylene sulfite, propylene sulfite, dimethyl sulfite, propane sultone, butane sultone, methyl methanesulfonate, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, thioanisole, diphenyl disulfide, and dipyridinium disulfide.

Examples of positive electrodes that can store and release lithium ions include oxides of transition metals such as $LiCoO_2$, $LiNiO_2$, $LiMn_2O_4$, $LiNiMnCoO_2$, $LiFePO_4$, $LiVOPO_4$, $V_2O_5$, $MnO_2$, $TiS_2$, and $MoS_2$, Li, and chalcogen compounds.

A non-aqueous electrolyte secondary battery of the present invention includes a negative electrode, a positive electrode and an electrolyte solution, which are characterized in having the aforementioned features. Other structures such as a material of a separator and a shape of battery can be formed into conventional ones without particularly restricting.

For example, a shape of a non-aqueous electrolyte secondary battery is optional without particular restriction. In general, a coin type battery where an electrode and a separator, which are punched out into a coin shape, are stacked, a rectangular type or cylinder type battery where an electrode sheet and a separator are spirally wound can be cited.

Further, a separator that is used between a positive electrode and a negative electrode is not particularly restricted as long as it is stable against an electrolyte solution and excellent in the water retention property. In general, examples of the separators include porous sheets or nonwoven fabrics of polyolefins such as polyethylene and polypropylene, copolymers thereof and aramide resin. These may be used in a single layer or stacked in a multilayer, or ceramics such as metal oxide may be stacked on a surface. Further, porous glass and ceramics can be used as well.

EXAMPLES

In what follows, the present invention will be more specifically described with reference to examples and comparative examples. However, the present invention is not restricted thereto. Within technical features described in Claims, an appropriate modification can be applied.

Example 1

According to the following method, a battery were prepared and evaluated.
<Preparation of Negative Electrode Material>
Firstly, 50 g of silicon oxide powder having an average particle size of 5 μm and an amount of coated carbon of 15% by mass was added to 70 g of toluene and stirred, a solution obtained by diluting 0.06 g of perfluoropolyether-modified polysilazane (hereinafter, referred to as compound 1) constituted of a unit shown by the following chemical formula with 0.24 g of hexafluorometaxylene was added, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 0.1% by mass with respect to a base material (silicon oxide coated with a carbon film).

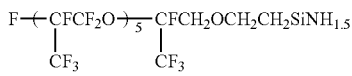

<Preparation of Electrode>
Then, 90% by mass of the negative electrode material prepared above and 10% by mass of polyimide were mixed. N-methylpyrrolidone was further added, and thereby a slurry was obtained. The slurry was coated on both surfaces of a copper foil having a thickness of 11 μm. After drying at 100° C. for 30 min, an electrode was shaped under pressure with a roller press, and the electrode was vacuum dried at 400° C. for 2 hours. Thereafter, the electrode was cut into 5.8 cm×75 cm as a negative electrode.

Further, 94% by mass of lithium cobalt oxide, 3% by mass of acetylene black and 3% by mass of polyvinylidene fluoride were mixed. N-methylpyrrolidone was further added therein to form a slurry. The slurry was coated on an aluminum foil having a thickness of 16 μm. After the slurry that was coated on the aluminum foil was dried at 100° C. for 1 hour, an electrode was shaped under pressure with a roller press. The electrode was vacuum dried at 120° C. for 5 hours and cut into 5.7 cm×69 cm as a positive electrode.
<Preparation of Cylindrical Battery>
With prepared negative electrode and positive electrode, a non-aqueous electrolyte solution obtained by dissolving $LiPF_6$ in a mixed solution of ethylene carbonate; diethyl carbonate=1:1 (by volume ratio) at a concentration of 1 mol/L, and a separator of a polypropylene microporous film having a thickness of 20 μm, a cylindrical lithium ion secondary battery for evaluation was prepared.
<Battery Evaluation>
After the prepared cylindrical lithium ion secondary battery was left at room temperature overnight, charge/discharge was performed by use of a secondary battery charge/discharge test apparatus (manufactured by ASKA Electronic Co., Ltd.). Firstly, charge was conducted at a constant current of 300 mA/cm² until a voltage of a test cell reaches 4.2 V, after the cell voltage has reached 4.2 V, charge was performed by reducing a current so as to maintain the cell voltage of 4.2 V, and at a time point when a current value became smaller than 50 mA/cm², the charge was ended. Discharge was conducted at a constant current of 300 mA/cm², at a time point when the cell voltage has reached 2.5 V, the discharge was ended. According to an operation described above, an initial charge/discharge capacity and initial charge/discharge efficiency were obtained.

By repeating the above-described charge/discharge test, charge/discharge test after 300 cycles of a lithium ion secondary battery for evaluation was performed. Results thereof are shown in Table 1.
<Gas Generation Test>
The slurry that was used to prepare a negative electrode of a cylindrical lithium ion secondary battery for evaluation was coated on both surfaces of a copper foil having a thickness of 11 μm, and, after drying at 100° C. for 30 min, an electrode was shaped under pressure with a roller press. The electrode was vacuum dried at 400° C. for 2 hours. Thereafter, the electrode was cut into 5 cm×10 cm as a negative electrode. From a mass of electrode after drying, a mass of coated active material was 0.5 g.

The prepared negative electrode was put in an aluminum laminated bag, 0.5 g of an electrolyte solution used in a cylindrical lithium ion secondary battery for evaluation was added, a laminate was hermetically sealed and left at 120° C. for two weeks. From a volume change of the laminate bag before and after heating, an amount of generated gas was calculated. Results thereof are shown in Table 1.

Example 2

According to the following method, a battery was prepared and evaluated.
<Preparation of Negative Electrode Material>
Firstly, 50 g of silicon oxide powder having an average particle size of 5 μm and an amount of coated carbon of 15% by mass was added to 70 g of toluene and stirred, a solution obtained by diluting 3 g of the compound 1 with 12 g of hexafluorometaxylene was added, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 5% by mass with respect to a base material (silicon oxide coated with a carbon film).

With a negative electrode prepared according to a method similar to that of example 1 with a negative electrode material prepared, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Example 3

According to the following method, a battery was prepared and evaluated.
<Preparation of Negative Electrode Material>
Firstly, 50 g of silicon powder having an average particle size of 5 μm was added to 70 g of toluene and stirred, a solution obtained by diluting 0.06 g of the compound 1 with 0.24 g of hexafluorometaxylene was added, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 0.1% by mass with respect to a base material (silicon).
<Preparation of Electrode>
Then, 85% by mass of the negative electrode material prepared above, 5% by mass of artificial graphite (average particle size: 10 μm), and 10% by mass of polyimide were mixed. N-methylpyrrolidone was further added, and thereby a slurry was obtained. The slurry was coated on a copper foil having a thickness of 11 μm. After drying at 100° C. for 30 min, an electrode was shaped under pressure with a roller press, and the electrode was vacuum dried at 400° C. for 2 hours. Thereafter, the electrode was cut into 5.8 cm×75 cm as a negative electrode.

With a negative electrode and a non-aqueous electrolyte solution, which were prepared according to a method similar to that of example 1, a cylindrical lithium ion secondary battery was prepared. The prepared lithium ion secondary battery was subjected to battery evaluation and gas generation test in a manner similar to Example 1. Results thereof are shown in Table 1.

Example 4

According to the following method, a battery was prepared and evaluated.
<Preparation of Negative Electrode Material>
Firstly, 50 g of silicon powder having an average particle size of 5 μm was added to 70 g of toluene and stirred, a solution obtained by diluting 3 g of the compound 1 with 12 g of hexafluorometaxylene was added therein, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 5% by mass with respect to a base material (silicon).

With a negative electrode prepared in a manner similar to that of example 3 with the prepared negative electrode material, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Example 5

A battery was prepared according to the following method, and evaluated.
<Preparation of Negative Electrode Material>
Firstly, 50 g of silicon-titanium alloy powder having an average particle size of 5 μm and a composition of Si/Ti=90/10 (mass ratio) was added to 70 g of toluene and stirred, a solution obtained by diluting 0.06 g of the compound 1 with 0.24 g of hexafluorometaxylene was added, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 0.1% by mass with respect to a base material (silicon-titanium alloy).

With a negative electrode prepared in a manner similar to that of example 3 with the prepared negative electrode material, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Example 6

A battery was prepared according to the following method, and evaluated.
<Preparation of Negative Electrode Material>
Firstly, 50 g of silicon-titanium alloy powder having an average particle size of 5 μm and a composition of Si/Ti=90/10 (mass ratio) was added to 70 g of toluene and stirred, a solution obtained by diluting 3.0 g of the compound 1 with 12 g of hexafluorometaxylene was added therein, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound that contains a perfluoropolyether group of a negative electrode material was found to be 5% by mass with respect to a base material (silicon-titanium alloy).

With a negative electrode prepared in a manner similar to that of example 3 with the prepared negative electrode material, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Example 7

Except that in place of the compound 1, perfluoropolyether-modified polysilazane configured of a unit shown by the following chemical formula (hereinafter referred to as compound 2) was used, in a manner similar to that of Example 1, a negative electrode material was prepared and evaluated. Results thereof are shown in Table 1.

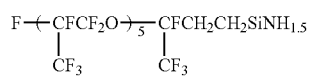

Example 8

Except that in place of the compound 1, perfluoropolyether-modified polysilazane configured of a unit shown by the following chemical formula (hereinafter referred to as compound 3) was used, in a manner similar to that of Example 1, a negative electrode material was prepared and evaluated. Results thereof are shown in Table 1.

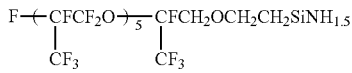

Example 9

Except that in place of the compound 1, perfluoropolyether-modified polysilazane configured of a unit shown by the following chemical formula (hereinafter referred to as compound 4) was used, in a manner similar to that of Example 1, a negative electrode material was prepared and evaluated. Results thereof are shown in Table 1.

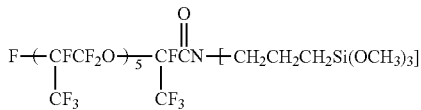

Example 10

According to the following method, a battery was prepared and evaluated.
<Preparation of Negative Electrode Material>
Firstly, 50 g of silicon oxide having an average particle size of 5 μm and an amount of coated carbon of 15% by mass was added to 70 g of toluene and stirred, a solution obtained by diluting 0.04 g of the compound 1 with 0.2 g of hexafluorometaxylene was added therein, and the resulted dispersion was stirred under toluene reflux at 120° C. for 2 hours. Thereafter, toluene was distilled away, the resulted powder was heated and dried under reduced pressure at 200° C. for 2 hours, and a targeted negative electrode material in which silicon oxide is coated with an organosilicon compound containing a perfluoropolyether group was obtained. By thermogravimetric analysis, a mass of a film of an organosilicon compound that contains a perfluoropolyether group of a negative electrode material was found to be 0.06% by mass with respect to a base material (silicon oxide coated with a carbon film).

With a negative electrode prepared with the prepared negative electrode material according to a method similar to example 1, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Example 11

According to the following method, a battery was prepared and evaluated.
<Preparation of Negative Electrode Material>
Firstly, 50 g of silicon oxide having an average particle size of 5 μm and an amount of coated carbon of 15% by mass was added to 70 g of toluene and stirred, a solution obtained by diluting 4.5 g of the compound 1 with 16 g of hexafluorometaxylene was added therein, and the resulted solution was stirred under toluene reflux at 120° C. for 2 hours. Thereafter, toluene was distilled away, the resulted powder was heated and dried under reduced pressure at 200° C. for 2 hours, and a targeted negative electrode material in which silicon oxide is coated with an organosilicon compound containing a perfluoropolyether group was obtained. By thermogravimetric analysis, a mass of a film of an organosilicon compound that contains a perfluoropolyether group of a negative electrode material was found to be 8% by mass with respect to a base material (silicon oxide coated with a carbon film).

With a negative electrode prepared with the prepared negative electrode material according to a method similar to that of example 1, a positive electrode, and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Comparative Example 1

According to the following method, a battery was prepared and evaluated.

Firstly, with a negative electrode that was prepared according to a method similar to that of example 1 with silicon oxide powder having an average particle size of 5 μm and an amount of coated carbon of 15% by mass as an negative electrode material, a positive electrode and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Comparative Example 2

According to the following method, a battery was prepared and evaluated.

Firstly, with a negative electrode that was prepared according to a method similar to that of example 3 with silicon oxide powder having an average particle size of 5 μm as an negative electrode material, a positive electrode and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Comparative Example 3

According to the following method, a battery was prepared and evaluated.

Firstly, with a negative electrode that was prepared according to a method similar to that of example 5 with silicon-titanium alloy powder having an average particle size of 5 μm and a composition of Si/Ti=90/10 (mass ratio) as an negative electrode material, a positive electrode and an electrolyte solution, a cylindrical lithium ion secondary battery for evaluation was prepared. The prepared lithium ion secondary battery was subjected to battery evaluation and gas generation test in a manner similar to that of Example 1. Results thereof are shown in Table 1.

Comparative Example 4

According to the following method, a battery was prepared and evaluated.

An active material layer of a negative electrode that was prepared according to a method similar to that of comparative example 1 was formed. After the formation of the negative electrode, a solution obtained by diluting the compound 1 with hexafluorometaxylene was uniformly coated on an active material layer of a negative electrode (that is, surface of each particle of the active material is not coated) and dried under reduced pressure at 200° C. for 2 hours, thereby a film of an organosilicon compound that contains a perfluoropolyether group was formed on an active material layer. From a mass increase in an electrode before and after film formation, it was found that an organosilicon compound that was formed and contains a perfluoropolyether group is 0.1% by mass with respect to a negative electrode material used.

With the prepared negative electrode, and with a positive electrode and an electrolyte solution, which were prepared according to a method similar to that of example 1, a cylindrical lithium ion secondary battery for evaluation was prepared. The prepared lithium ion secondary battery was subjected to battery evaluation and gas generation test in a manner similar to that of example 1. Results thereof are shown in Table 1.

Comparative Example 5

According to the following method, a battery was prepared and evaluated.

<Preparation of Negative Electrode Material>

Firstly, 50 g of silicon oxide having an average particle size of 5 µm and an amount of coated carbon of 15% by mass was added to 70 g of toluene and stirred, 3.0 g of phenyltriethoxysilane was added therein, and the resulted dispersion was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound (phenyltriethoxysilane) of a negative electrode material was found to be 5% by mass with respect to a base material (silicon oxide coated with a carbon film).

With a negative electrode prepared according to a method similar to that of example 1 with the prepared negative electrode material, a positive electrode and an electrolyte solution, a cylindrical lithium ion secondary battery for evaluation was prepared. The prepared lithium ion secondary battery was subjected to battery evaluation and gas generation test in a manner similar to that of example 1. Results thereof are shown in Table 1.

Comparative Example 6

According to the following method, a battery was prepared and evaluated.

<Preparation of Negative Electrode Material>

Firstly, 50 g of silicon oxide having an average particle size of 5 µm and an amount of coated carbon of 15% by mass was added to 70 g of toluene and stirred, 3.0 g of mercaptopropyltrimethoxysilane was added therein, and the resulted dispersion was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound (mercaptopropyltrimethoxysilane) of a negative electrode material was found to be 5% by mass with respect to a base material (silicon oxide coated with a carbon film).

With a negative electrode that was prepared according to a method similar to that of example 1 with the prepared negative electrode material, a positive electrode and an electrolyte solution, a cylindrical lithium ion secondary battery for evaluation was prepared. The prepared lithium ion secondary battery was subjected to battery evaluation and gas generation test in a manner similar to that of example 1. Results thereof are shown in Table 1.

Comparative Example 7

According to the following method, a battery was prepared and evaluated.

<Preparation of Negative Electrode Material>

Firstly, 50 g of silicon oxide having an average particle size of 5 µm and an amount of coated carbon of 15% by mass was added to 70 g of toluene and stirred, a solution obtained by diluting 3.0 g of perfluorooctylethyltrimethoxysilane with 12 g of hexafluorometaxylene was added therein, and the resulted dispersion was stirred under toluene reflux at 120° C. for 2 hours. Thereafter, toluene was distilled away, the resulted powder was heated and dried under reduced pressure at 200° C. for 2 hours, and a targeted negative electrode material was obtained. By thermogravimetric analysis, a mass of a film of an organosilicon compound (perfluorooctylethyltrimethoxysilane) of a negative electrode material was found to be 5% by mass with respect to a base material (silicon oxide coated with a carbon film).

With the prepared negative electrode material, a negative electrode was tried to prepare according to a method similar to that of example 1. However, the negative electrode material repelled a binder and N-methylpyrrolidone and a homogeneous slurry was difficult to prepare. Accordingly, the battery test and gas generation test were not performed.

TABLE 1

|  | Particles of silicon-based active material | Amount of coated organosilicon compound (%) (Treating reagent) | Initial charge capacity (mAh/g) | Initial charge/ discharge efficiency (%) | Capacity retention rate after 300 cycles (%)) | Amount of generated gas (mL) |
|---|---|---|---|---|---|---|
| Example 1 | Carbon film + silicon oxide | 0.1 (Compound 1) | 3010 | 70 | 74 | 2.0 |

TABLE 1-continued

| | Particles of silicon-based active material | Amount of coated organosilicon compound (%) (Treating reagent) | Initial charge capacity (mAh/g) | Initial charge/ discharge efficiency (%) | Capacity retention rate after 300 cycles (%)) | Amount of generated gas (mL) |
|---|---|---|---|---|---|---|
| Example 2 | Carbon film + silicon oxide | 5 (Compound 1) | 2850 | 69 | 77 | 0.8 |
| Example 3 | Silicon | 0.1 (Compound 1) | 3840 | 89 | 23 | 0.4 |
| Example 4 | Silicon | 5 (Compound 1) | 3660 | 88 | 26 | 0.1 |
| Example 5 | Silicon alloy | 0.1 (Compound 1) | 3100 | 74 | 35 | 0.2 |
| Example 6 | Silicon alloy | 5 (Compound 1) | 3080 | 72 | 38 | 0.1 |
| Example 7 | Carbon film + silicon oxide | 0.1 (Compound 2) | 3010 | 70 | 73 | 2.3 |
| Example 8 | Carbon film + silicon oxide | 0.1 (Compound 3) | 2990 | 69 | 72 | 2.4 |
| Example 9 | Carbon film + silicon oxide | 0.1 (Compound 4) | 3010 | 69 | 74 | 3.1 |
| Example 10 | Carbon film + silicon oxide | 0.06 (Compound 1) | 3010 | 70 | 67 | 15.6 |
| Example 11 | Carbon film + silicon oxide | 8 (Compound 1) | 2640 | 69 | 71 | 0.1 |
| Comparative example 1 | Carbon film + silicon oxide | — | 3030 | 70 | 66 | 22.3 |
| Comparative example 2 | Silicon | — | 3830 | 89 | 19 | 5.3 |
| Comparative example 3 | Silicon alloy | — | 3070 | 74 | 30 | 3.2 |
| Comparative example 4 | Carbon film + silicon oxide | 0.1 (On active material layer) (Compound 1) | 3000 | 70 | 70 | 6.3 |
| Comparative example 5 | Carbon film + silicon oxide | 5 (Phenyltriethoxysilane) | 3030 | 70 | 67 | 21.4 |
| Comparative example 6 | Carbon film + silicon oxide | 5 (Mercaptopropyltrimethoxysilane) | 3010 | 69 | 66 | 22.0 |
| Comparative example 7 | Carbon film + silicon oxide | 5 (Perfluorooctylethyltrimethoxysilane) | — | — | — | — |

As was shown in Table 1, examples 1 to 11 where a negative electrode material in which a silicon-based active material is coated with a film of an organosilicon compound that contains a perfluoropolyether group is used were confirmed to be lithium ion secondary batteries that are favorably compared with comparative examples 1 to 3 where a film was not formed in that an amount of generated gas is less, the capacity retention rate after 300 cycles is improved, capacity is high and the cycle characteristics are excellent, and safety and reliability are high.

In example 10 where a mass ratio of the film of an organosilicon compound with respect to a silicon-based active material is less than 0.1%, a prevention effect of gas generation was smaller and a degree of improvement of the cycle characteristics was smaller than examples 1 and 2 but was improved more than comparative example 1. In example 11 where the mass ratio is larger than 5%, the initial charge capacity was lower than examples 1 and 2 but was improved more than comparative example 1.

In comparative example 4 where a film of organosilicon compound that contains a perfluoropolyether group is formed not on particles but on an active material layer after forming a negative electrode, the prevention effect of gas generation and the cycle characteristics were improved. However, the effect thereof was smaller than that of examples 1 and 2.

Further, in comparative examples 5 and 6 where a film of organosilicon compound was changed to a film of organosilicon compound that does not contain a perfluoropolyether group, the prevention effect of gas generation and an improvement in the cycle characteristics were not observed.

From Table 1, it can be said that the present invention is particularly effective in a non-aqueous electrolyte secondary battery that uses silicon oxide as a negative electrode active material because among silicon-based active materials that are not coated with a film of organosilicon compound, an amount of gas generation is particularly large in an electrode where silicon oxide is used.

As was shown above, in examples 1 to 11 where a negative electrode material in which particles of silicon-based active material are coated with a film of organosilicon compound that contains a perfluoropolyether group was used, batteries that have high capacity, are excellent in the cycle characteristics, suppressed in the gas generation, and high in safety and reliability were obtained. On the other hand, in comparative examples 1 to 3 where a negative electrode material was not coated with a film of organosilicon compound, comparative example 4 where the film of organosilicon compound was formed on a negative electrode active material layer after electrode preparation, and comparative examples 5 and 6 where a negative electrode material was coated with a film of organosilicon compound that does not contain a perfluoropolyether group, the gas generation could not be suppressed, and the cycle characteristics were poor than that of examples 1 to 11. Further, in comparative example 7 where particles of silicon-based active material are coated with a film of organosilicon compound that contains a perfluoroalkyl group, a binder and N-methylpyrrolidone were repelled and it was difficult to prepare a slurry; accordingly, it was difficult to prepare an electrode.

The present invention is not restricted to the above embodiments. The embodiments are illustration and all what has the structure substantially the same as technical ideas described in claims of the present invention and has the same effect therewith are contained in the technical range of the present invention.

The invention claimed is:

1. A negative electrode material for a non-aqueous electrolyte secondary battery comprising:
   particles of a silicon-based active material, wherein the particles of a silicon-based active material are coated with a film of an organosilicon compound that contains a perfluoropolyether group, wherein
   a particle of the silicon-based active material is made of any of silicon, silicon oxide, silicon oxide coated with a carbon film, and a silicon alloy, and
   the organosilicon compound that contains a perfluoropolyether group is a compound having a structure represented by the following formula (1),

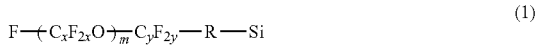  (1)

wherein R represents an organic group, m represents an integer of 1 or more, x and y each represent an integer of 1 to 4.

2. The negative electrode material for a non-aqueous electrolyte secondary battery according to claim 1, wherein the film of an organosilicon compound containing a perfluoropolyether group is 0.1% by mass or more and 5% by mass or less of a particle of the silicon-based active material.

3. The negative electrode material for a non-aqueous electrolyte secondary battery according to claim 1, wherein a perfluoropolyether part represented by the following formula (2) in the formula (1),

  (2)

is a structure represented by the following formula (3),

  (3)

wherein m represents the same as that described above.

4. The negative electrode material for a non-aqueous electrolyte secondary battery according to claim 1, wherein a particle of the silicon-based active material is made of a silicon alloy.

5. The negative electrode material for a non-aqueous electrolyte secondary battery according to claim 1, wherein a particle of the silicon-based active material is made of silicon oxide coated with a carbon film.

6. The negative electrode material for a non-aqueous electrolyte secondary battery according to claim 1, wherein a particle of the silicon-based active material is made of silicon oxide.

7. The negative electrode material for a non-aqueous electrolyte secondary battery according to claim 1, wherein a particle of the silicon-based active material is made of silicon.

8. A non-aqueous electrolyte secondary battery that uses the negative electrode material for a non-aqueous electrolyte secondary battery of claim 1.

9. A non-aqueous electrolyte secondary battery that uses the negative electrode material for a non-aqueous electrolyte secondary battery of claim 2.

10. A non-aqueous electrolyte secondary battery that uses the negative electrode material for a non-aqueous electrolyte secondary battery of claim 5.

11. A non-aqueous electrolyte secondary battery that uses the negative electrode material for a non-aqueous electrolyte secondary battery of claim 6.

12. A non-aqueous electrolyte secondary battery that uses the negative electrode material for a non-aqueous electrolyte secondary battery of claim 3.

13. A non-aqueous electrolyte secondary battery that uses the negative electrode material for a non-aqueous electrolyte secondary battery of claim 7.

14. A non-aqueous electrolyte secondary battery that uses the negative electrode material for a non-aqueous electrolyte secondary battery of claim 4.

15. The negative electrode material for a non-aqueous electrolyte secondary battery according to claim 1, wherein an average size of the silicon-based active material is 0.1 to 50 μm.

* * * * *